United States Patent [19]

Schultz

[11] Patent Number: 5,313,995
[45] Date of Patent: May 24, 1994

[54] CENTRAL TIRE INFLATION SYSTEM
[75] Inventor: Gary R. Schultz, Kalamazoo, Mich.
[73] Assignee: Eaton Corporation, Cleveland, Ohio
[21] Appl. No.: 469,719
[22] Filed: Jan. 24, 1990

Related U.S. Application Data

[63] Continuation of Ser. No. 67,745, Jun. 29, 1987, abandoned.
[51] Int. Cl.$^5$ .............................................. B60C 23/00
[52] U.S. Cl. ...................................... 152/416; 137/224
[58] Field of Search ........................ 152/415, 416, 417;
  137/224, 226, 102, 625.2; 141/38, 83, 95

[56] References Cited

U.S. PATENT DOCUMENTS

| | | | |
|---|---|---|---|
| 3,099,309 | 7/1963 | Horta et al. | 152/416 |
| 3,099,309 | 7/1963 | Horta et al. | 152/416 |
| 4,434,833 | 3/1984 | Swanson et al. | 152/417 |
| 4,434,833 | 3/1984 | Swanson et al. | 152/417 |
| 4,640,331 | 2/1987 | Braun et al. | 152/417 |
| 4,640,331 | 2/1987 | Braun et al. | 152/417 |

Primary Examiner—Michael W. Ball
Assistant Examiner—Francis J. Lorin
Attorney, Agent, or Firm—P. S. Rulon

[57] ABSTRACT

A central tire inflation system for a vehicle is disclosed 10 including a controller 222 for preselecting one of several desired air pressures for the tires 12 by actuating one of the push buttons 226, 228 or 230. The system 10 will adjust the tire pressure to the preselected pressure. Should the operator sense enemy fire or believes combat is eminent, the "run flat" button 234 is actuated which causes the electronic timer of the control unit 237 to cause the automatic measurement of tire pressure every few seconds instead of several times an hour. Should one of the tires 12 be damaged while the button 234 is actuated, the damaged tire will be immediately identified and the system 10 will assume the inflate mode and supply air to the damaged tire so long as the leakage rate does not exceed the capacity of the source 138 of pressurized air.

3 Claims, 5 Drawing Sheets

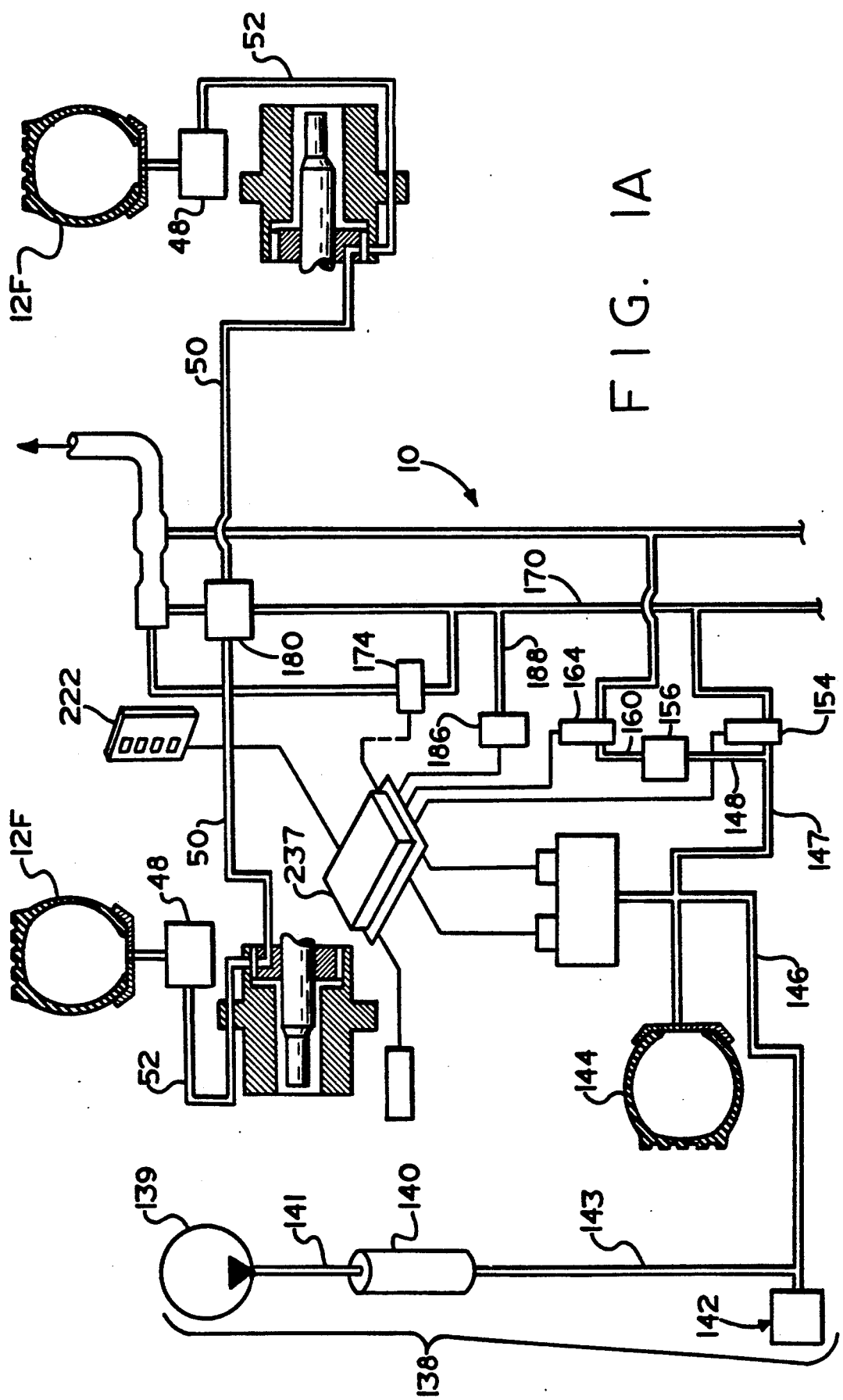
FIG. IA

CENTRAL TIRE INFLATION SYSTEM

This is a continuation of copending application Ser. No. 07/067,745 filed on Jun. 29, 1987, now abandoned.

BACKGROUND OF THE INVENTION

The present invention is an improvement to the central tire inflation systems (CTIS) shown in U.S. Pat. No. 4,640,331, assigned to the Assignee of this invention, also known as onboard inflation systems and tire traction systems, wherein the inflation pressure of one or more vehicle tires may be controlled from a remote location (usually the vehicle cab) with the vehicle at rest and/or in motion and utilizing an onboard source of pressurized fluid (usually compressed air from the vehicle air brake compressor and/or a compressed air reservoir and an air circuit connecting the source to each tire).

Central tire inflation systems, also known as tire traction systems, are well known in the prior art as may be seen by reference to U.S. Pat. Nos. 2,634,782; 2,976,906; 2,989,999; 3,099,309; 3,102,573; 3,276,502; 3,276,503; 4,313,483; 4,418,737, 4,421,151 and 4,434,833, the disclosures of all of which are hereby incorporated by reference. CTIS allow the operator to remotely manually and/or automatically vary and/or maintain the inflation pressure of one or more of the vehicle tires from the vehicle (usually a truck) air system, usually while the vehicle is in motion as well as when the vehicle is at rest.

It is well known that the traction of vehicles on relatively soft terrain (i.e. on mud, sand or snow) may be greatly improved by decreasing the inflation pressure within the tires. By decreasing the inflation pressure, the tire supporting surface (usually called the "footprint") will increase thereby enlarging the contact area between the tires and the terrain. Additionally, it is often desireable to decrease the tire pressure from the over-the-road or highway inflation pressure to increase riding comfort on rough roads. On the other hand, higher tire pressures decrease rolling resistance and tire carcass temperatures on smooth roads thereby increasing economy and safety. Accordingly, in cross country vehicles it is desirable to change the inflation pressure in the pneumatic tires to fit the terrain and is also desirable that a system be provided for changing the inflation pressure of the tires from an onboard source, while the vehicle is at motion or at rest, and that the system be controlled from the vehicles operating cab. This is especially true for military vehicles which usually travel in columns whereby stoppage of the vehicle would delay the entire column. Additionally, if the military is under enemy attack, it is imperative that the vehicle maintain its maneuverability as long as is possible. If a tire has been punctured by gun fire or the like, it is imperative to be able to at least partially inflate the damaged tire, if possible, so that the vehicle remains mobile.

CTIS known in the prior art provide for isolation of a vehicle tire subject to extreme damage. However, they do not provide a means for preselecting a "run flat" mode for the CTIS whereby the controller causes system pressure to be rapidly and frequently sensed so that a tire damaged in combat, or the like, may be identified and supplied with pressurized air immediately after being damaged and whereby the compressed air stored in the undamaged vehicle tires and the vehicle compressed air reservoirs, such as the brake system, can be utilized to supplement air to a tire damaged or punctured by gunfire or the like.

U.S. Pat. No. 4,640,331, assigned to the Assignee of this invention, discloses a CTIS utilizing a valve assembly comprising a control valve and a low tire pressure shutoff valve at each wheel end assembly (usually a single or dual tire) which valve assembly is connected to the central control system by a single pressure line or conduit through a rotary seal assembly. Pressurization of the single pressure conduit is effective to open and close communication to the vehicle tire and to cause inflation and/or deflation of said tire to a selected pressure. The low tire pressure shutoff valve is effective to automatically isolate the tire associated therewith from the remainder of the central tire inflation system when the inflation pressure thereof is below a predetermined minimum reference value. However, the system pressure is measured at an infrequent rate and is unable to immediately identifying a tire damaged by gunfire, or the like, nor automatically maintain sufficient pressure therein as long as the leakage rate in the damaged tire exceeds a predetermined minimum, at which time the damaged tire is automatically isolated.

Accordingly, it is an object of the present invention to provide a new and improved central tire inflation system provided with a means for preselecting a "run flat" mode of operation enabling the system pressure to be frequently sensed so that a tire damaged in combat, or otherwise may be immediately identified and supplied with sufficient pressurized air to delay or avoid the damaged tire from being isolated.

This and other objects and advantages of the present invention will become apparent from a reading of the following description of the preferred embodiments taken in connection with the attached drawings.

BRIEF DESCRIPTION OF THE DRAWINGS

FIGS. 1A and 1B comprise a schematic illustration of the pneumatic components of the present invention as utilized to control the inflation of a 6×6 vehicle.

Figure 6:
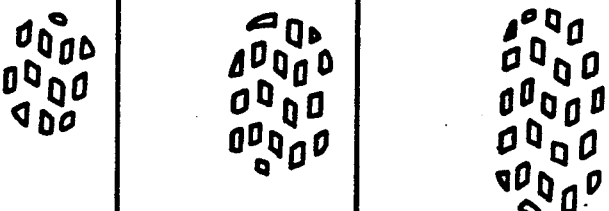
FIG. 6 is a diagrammatic representation of tire imprints at different tire inflation pressures.

The advantages of varying the inflation pressure of the pneumatic tires (especially the driven tires) of a vehicle, especially a relatively heavy duty vehicle, in accordance with the terrain over which the vehicle is traveling are well known in the prior art and may be appreciated by reference to FIG. 6. Assuming, for example, the vehicle rear drive axle tires are normally inflated to about 75 psi (pounds per square inch) for highway operation, decreasing the tire inflation pressure to about 30 psi for cross country travel over rough road or to about 20 psi for operation in sand, mud or snow conditions will result in the tire having a greater contact area, (i.e. footprint), and improved traction. In addition to improved traction at lower tire inflation pressure, the vehicle will be able to maintain a higher speed over poor ground, and reduce wear and tear on the vehicle, because of the smoother ride over "washboard" type terrain. Conversely, to reduce operating temperature and wear and tear on the tires at highway speed, a higher tire inflation pressure is desired. Of course, to increase mobility, it is highly desirable that the tire inflation pressures be controllable from the vehicle cab from an onboard source of pressurized fluid and be variable and maintainable with the vehicle in motion as well as when the vehicle is at rest. It is also highly desirable that the inflation pressure of the vehicle tires be variable and measurable independently of the central tire pressure inflation system for rapid checking and increasing or decreasing of the tire inflation pressure. This is especially desirable for initial inflation of the tires.

Figure 1B:
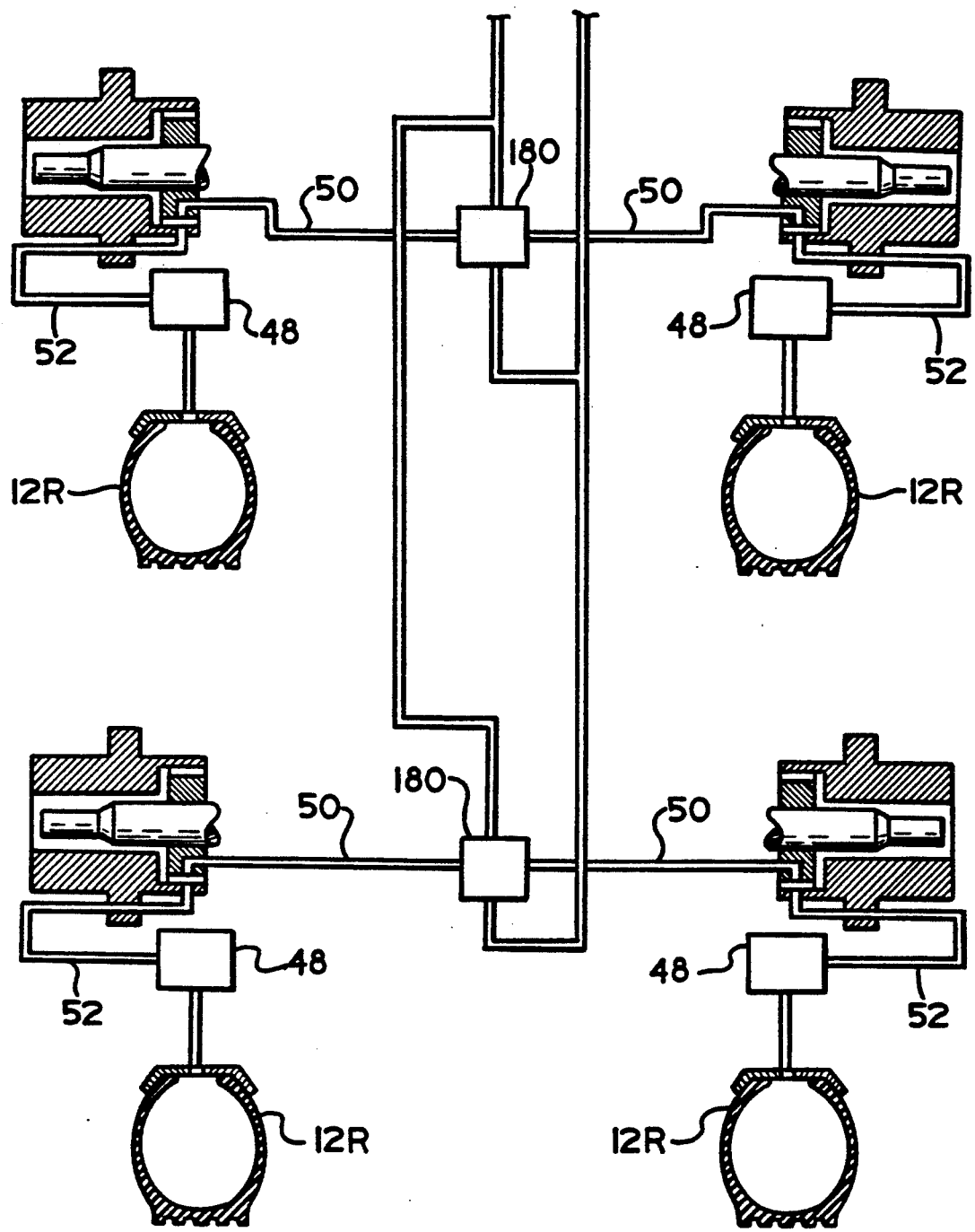

A central tire inflation system 10 for a multi-axle vehicle, such as a 6×6 truck, is shown in FIGS. 1A and 1B. The central tire inflation system 10 will control the inflation pressure of the four driven rear tires 12R and the two driven front tires 12F.

Figure 2:
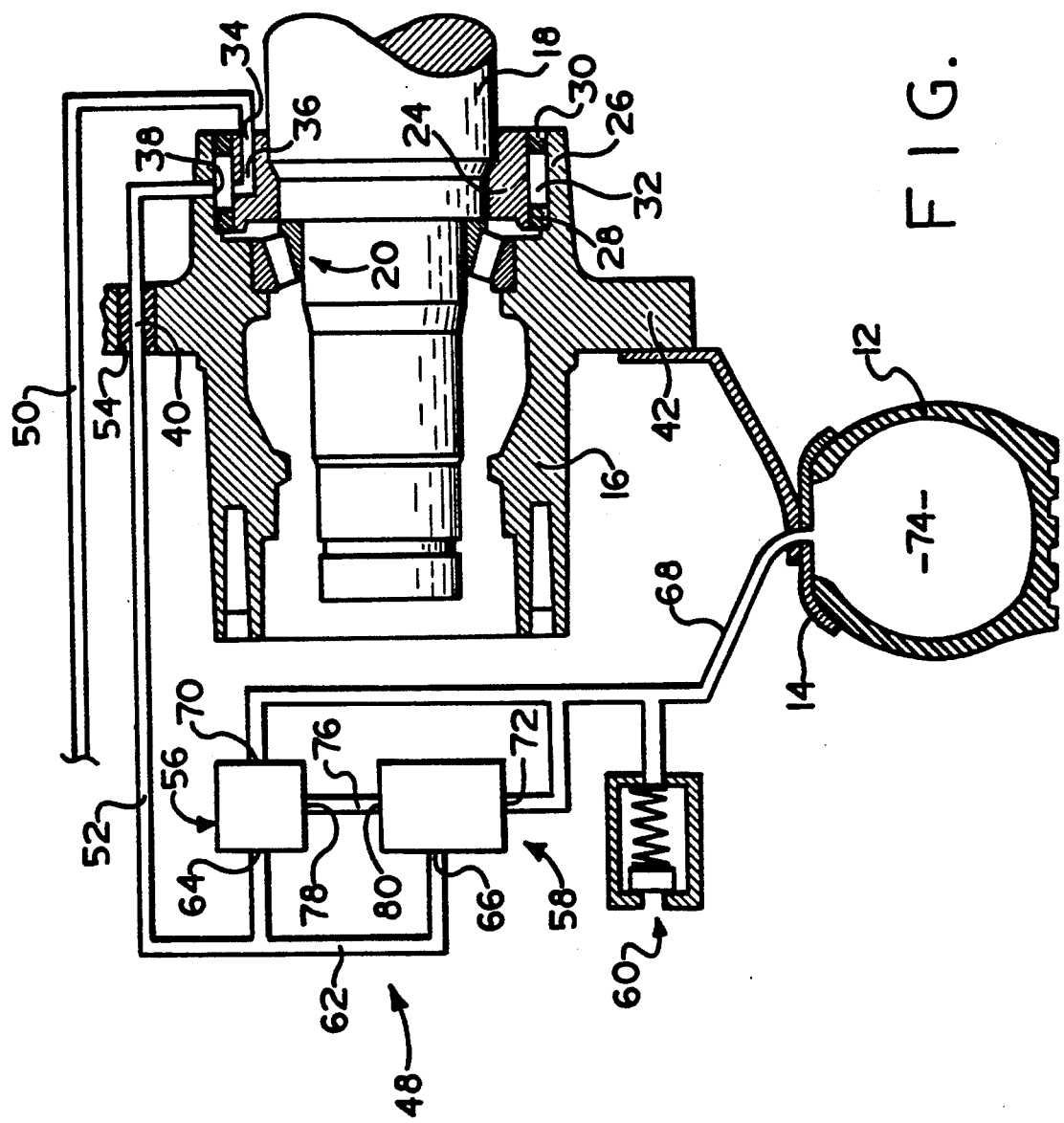
FIG. 2 is a schematic illustration of the pneumatic components downstream from the rotary seal.

As shown in FIG. 2, each inflatable tire 12 is mounted to a tire rim 14 which is fixed to a wheel hub assembly 16 rotationally supported on the outer end of each axle 18 by means of bearings 20. As may be seen in greater detail by reference to U.S. Pat. No. 4,434,833, assigned to the Assignee of this invention, an annular sleeve 24 may be pressed to the axle at a location inboard of the bearings 20 and the wheel hub may define an inboardly extending sleeve-type annular flange 26 telescopically surrounding sleeve 24. A pair of rotary seals 28 and 30 extend radially between the outer periphery of sleeve 24 and the inner periphery of sleeve-type flange 26 to define an annular sealed chamber 32 therebetween. Sleeve 24 is provided with an inlet 34 and a passage 36 opening to the chamber 32. Sleeve-type flange 26 is provided with a generally radially extending passage 38 extending from the sealed annular chamber 32 to the exterior outer diameter surface thereof. A single passage 40 may be provided in the radial flange portion 42 of the wheel hub 16 for passage of a pressure conduit. The above construction is described in above mentioned U.S. Pat. No. 4,434,833 and forms no part of the present invention. It is understood, of course, that the present invention is equally applicable to wheel hub/axle housing assemblies (also called "wheel-end assemblies") of other constructions.

The central tire inflation system 10 may be considered to comprise two components, a stationary component fixed to the vehicle chassis and a rotational component rotationally fixed to each wheel hub 16 and tire 12. The stationary component is fluidly connected to the rotational component by means of the annular chamber 32 defined by the rotary seals 28 and 30. Fluid conduit 50 from the stationary component is fluidly connected to the inlet 34 of passage 36 formed in sleeve 24 while fluid conduit 52 leading to the wheel valves 48 is fluidly connected to the passage 38 formed in sleeve-type flange 26 and passes through the opening 40 defined in the flange 42 of the hub 16. To protect conduit 52, a grommet or bushing 54 may be provided in the opening 40 or opening 40 may be defined by a bore in a wheel stud. Of course, alternatively, a passage may be provided in hub 16 opening to the outboard side thereof. It may thus be seen that attachment of system 10 to a wheel end assembly requires no drilling of the axle housing 18 and drilling of only a single hole 40 through radial flange 42 of the wheel hub 16. Accordingly, initial installation and/or retrofit of system 10 to a vehicle is considerably simplified and will not weaken the load supporting structures of the axle housing and wheel hub. It is also noted that the rotary seals 28 and 30 and the conduit 50 leading to the wheel end assembly may be located at an inboard relatively protected location on the vehicle.

As shown in FIG. 2, the wheel valves 48 include a low pressure shutoff valve 56, a control valve 58 and a manual inflate and pressure check valve 60. Low pressure valve 56 and control valve 58 may be formed integrally and/or may be located interiorly of tire 12. The low pressure shut-off valve 56 and control valve 58 may be considered the tire valve assembly of system 10.

A manifold portion 62 of conduit 52 interconnects ports 64 and 66 of valves 56 and 58, respectively, with one another and with the conduit 50 via chamber 32 while a manifold conduit 68 interconnects ports 70 and 72 of valves 56 and 58, respectively, the manual inflate and check valve 60, and with the interior chamber 74 of the inflatable pneumatic tire 12. A conduit 76 interconnects ports 78 and 80 of valves 56 and 58, respectively. If dual tires are utilized, manifold conduit 68 may be split downstream of the valve 60 and manual shut-off valves provided to isolate the tires if required.

Figure 3:
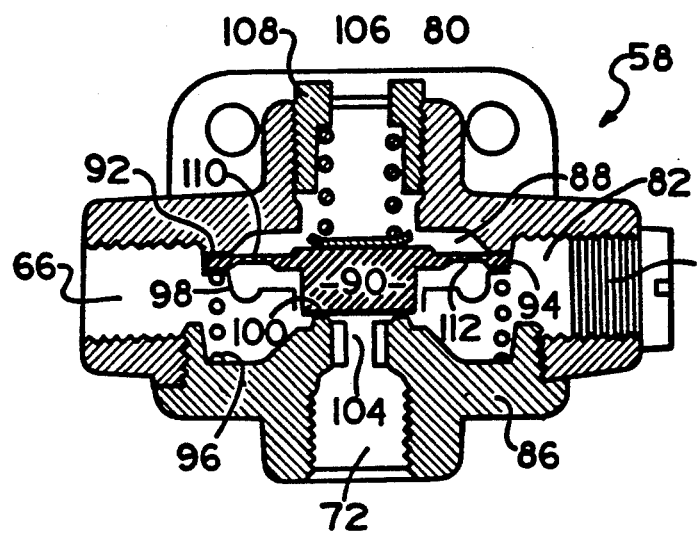
FIG. 3 is a sectional view of the control valve schematically illustrated in FIG. 2.
Figure 4:
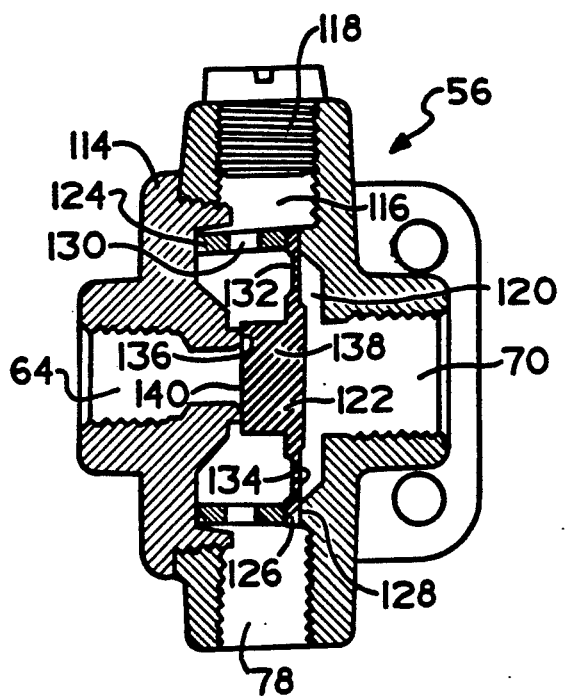
FIG. 4 is a sectional view of the low tire pressure shutoff valve schematically illustrated in FIG. 2.

The detailed structure and operation of control valve 58 and low tire pressure shutoff valve 56 may be seen by reference to FIGS. 3-4, respectively. While the structure of the various valves utilized in the subject invention will be described with a certain degree of detail, it is understood that valves and/or combinations of valves performing the same function, but of a different structure, may be substituted therefor. It is also understood that while the various conduits and passageways are illustrated as a one piece construction, multi-piece construction may be substituted therefor.

As may be seen by reference to FIG. 3, control valve 58 is a diaphragm valve which, in an attempt to utilize commercially available, proven components, is a modified truck air brake quick-release valve of the type sold by Berg Manufacturing Company as Part No. AC15793. The valve 58 defines four ports, port 66 connected to manifold portion 62 of conduit 52, port 72 connected to manifold conduit 68, port 80 connected to conduit 76 and an inoperative port 82 sealed by a plug 84. Valve 58 includes a body 86 defining a central chamber 88 in which a plug type diaphragm 90 is received. The valve body 86, which may be a multi-piece structure, defines a first annular valve seat 92 sealed by the outer periphery 94 of the diaphragm 90 for controlling fluid communication between ports 80 and 66. A spring and spring retainer 96 and 98, respectively, urges the outer periphery 94 of diaphragm 90 into sealing engagement with the annular valve seat 92. The valve body 86 also defines an annular valve seat 100 normally engaged by the plug portion 102 of the diaphragm 90 to control fluid communication between ports 66 and 72. A sleeve 104 is received in port 72 to provide a reduced orifice therethrough. A spring 106 and spring seat 108 are provided to bias the plug 102 into sealing engagement with seat 100 as will fluid pressure at port 80 acting on the upper surface 110 of diaphragm 90 which is of greater area than the under surface 112 thereof. The reduced orifice allows the use of a smaller biasing spring 106.

Spring 106 biases plug 102 against valve seat 100 against a pressure in port 72 (connected to the tire 12 via conduit 68) of about 100 psi, thus, limiting maximum tire pressure to 100 psi. Of course, other maximum tire pressures may be selected. Should tire pressure exceed the maximum pressure, plug 102 will move off of seat 100 communicating ports 72 and 66 allowing the excess tire pressure to be relieved in a manner to be described below. Excessive tire pressure can occur due to improper filling through the manual inflate valve 60 and-/or as a result of excessive operating temperatures of the tire 12. A pressure of about 10–20 psi at port 66, assuming port 80 is vented, acting on the under surface 112 of diaphragm 90 will lift the plug member 102 off of the seat 100 communicating ports 72 and 66 for establishing fluid communication between the tire and the seal chamber 32. As pressure at port 66 drops to below about 7 psi, spring 106 will again cause plug 102 to sealingly engage seat 100 to close the control valve. Accordingly, at less than about 7 psi pressure in conduits 50 and 52, the control valve 58 will be closed and at pressures above 10–20 psi, the control valve will be open between ports 66 and 72.

The low tire pressure shutoff valve 56 is illustrated in FIG. 4 and comprises a modified truck air brake system quick-release valve of the type available from Berg Manufacturing Company as Part No. AC15793, as is the control valve 58 described above. Low pressure shutoff valve 56 includes a valve body 114 defining four ports, port 64 connected to manifold portion 62 of conduit 52, port 70 connected to the interior chamber 74 of tire 12 via manifold conduit 68, port 78 connected to port 80 of valve 58 via conduit 76 and an unused port 116 sealed by plug 118. Valve body 114 also defines an interior chamber 120 in which a plug type diaphragm 122 is received. Valve 56 is modified by removal of the normally present diaphragm spring and replacement thereof by a sleeve member 124 which will rigidly hold the outer periphery 126 of the diaphragm 122 against the valve seat 128. Accordingly, port 70 is positively isolated from ports 64 and 78. Sleeve member 124 is provided with one or more apertures 130 to provide fluid communication between ports 64 and 78 and between port 78 and the under surface 132 of diaphragm 122 which is smaller in area than the upper surface 134 of diaphragm 122. Valve body 114 defines an annular valve seat 136 sealingly engageable by the plug portion 138 of the diaphragm 122 to control fluid communication between ports 64 and 78.

The surface area 134 of diaphragm 122 exposed to tire pressure at port 70 is sized to be at least ten times as large as the surface area 140 of plug portion 138 of diaphragm 122 exposed to supply pressure at port 64. Accordingly, so long as at least a minimum pressure is present in tire chamber 74, even a ten times greater supply pressure in manifold portion 62 communicating with port 64 will not cause valve 56 to open communication between ports 64 and 78. Assuming the supply pressure at port 64 is never to exceed 110 psi, a pressure of greater than 10 psi in the tire and in conduit 68 will maintain valve 56 closed. However, in the event of extensive damage to tire 12 rendering the tire incapable of maintaining at least a minimum pressurization, pressurization of the supply conduit 62 will result in plug 138 moving off of valve seat 136 and fluidly communicating ports 64 and 78 which will cause supply pressure to be applied via conduit 76 to port 80 of the control valve 58, which supply pressure acting on the upper surface 110 of the diaphragm 90 of valve 58 will cause control valve 58 to remain in the closed position blocking communication between port 66 and 72 thus automatically isolating the damaged tire. Thus, loss of system supply air through a damaged tire unable to maintain at least a predetermined minimum pressurization will be prevented allowing the remainder of the tire inflation system to inflate the remaining tires in a normal manner. When the tire inflation system is shut down, pressure on top of the diaphragm 90 acting on surface 110 bleeds off around the outer periphery 94 and valve seat 92. Of course, for the system to operate, an initial tire pressure above the minimum tire pressure, 10 psi for example, must be provided to the tire 12 through the initial inflate and pressure check valve 60.

The initial inflate and pressure check valve 60 is located in manifold conduit 68, or may be located directly in the tire rim, and is located downstream of the valves 56 and 58 for direct fluid communication to the interior chamber 74 of tire 12. Initial inflate and pressure check valve is of a standard tire valve stem construction as is well known in the prior art.

The relatively stationary portion includes a source of pressurized fluid 138 which typically includes a vehicle air system compressor 139, a pressurized air brake reservoir 140 supplied via line 141 by the compressor, compressed air system 142 supplied by line 143 consisting of air brakes, transmission and/or axle shift actuators and-/or controls, air suspensions and the like, and a spare tire 144. The brake reservoir 140 communicates with the air system 142, the spare tire 144 and the system reservoir 145 via conduits 146.

The conduit 146 is split defining branches 147 and 148 leading to the inlets of inflate valve 154 and pressure regulator 156, respectively. Pressure regulator 156 is connected to a conduit 160 leading to the inlet of deflate valve 164. The outlet of inflate valve 154 and of deflate valve 164, respectively, are connected to a manifold conduit 170. Manifold conduit 170 is also connected to the inlet of shutoff valve 174. Shutoff valve 174 has an outlet connected to exhaust. Manifold conduit 170 is also connected to a port 178 of quick-release valve 180 provided at each axle. A pressure transducer 186 is exposed to the pressure in conduit 170 by means of a branch conduit 188.

Each quick-release valve 180 defines a port 182 connected to exhaust and ports 184 connected to the conduit 50 leading to each wheel end assembly.

Pressure regulator 156 may be of any conventional design and will limit pressure flowing therethrough to conduit 160 to a relatively low pressure of about 8–10 psi, and further includes a an unshown exhaust port which is disclosed in greater detail in U.S. Pat. No. 4,640,331 and assigned to the assignee of this application. Accordingly, it may be seen that the inlet to the inflation valve 154 is exposed to supply pressure while the outlet of deflate valve 164 is in communication with a regulated pressure of about 8–10 psi. As will be seen, pressure regulator 156 regulates the quick-release valve 180 and thus regulates the minimum pressure to which system 10 will deflate tires 12.

Inflate valve 154, deflate valve 164 and shutoff valve 174 are each relatively small flow two-way valves, preferably solenoid controlled valves, of conventional design. Valves 154, 164 and 174 have a first or closed position blocking fluid flow between the inlet and outlet ports thereof and a second or open position permitting fluid flow between the inlet and outlet ports thereof. Typically, the solenoid two-way valves 154 and 164 are spring biased to the closed positions thereof while valve 174 is spring biased to the open position thereof.

Figure 5:
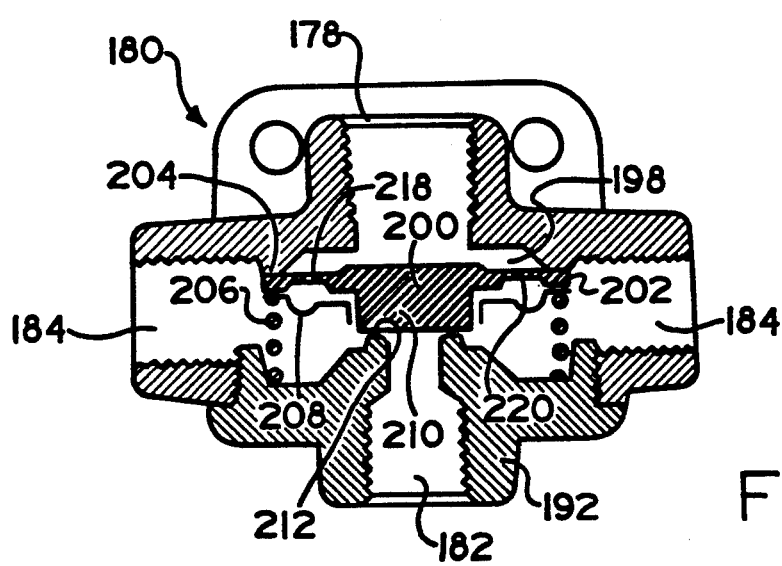
FIG. 5 is a sectional view of the quick release valve schematically illustrated in FIGS. 1A and 1B.

The detailed structure of quick-release or pressure release valves 180 may be seen by reference to FIG. 5. Briefly, the structure of quick-release valve 180 is substantially identical to the structure of control valve 58 described above with the exception of not utilizing an exhaust restrictor 104 as is utilized in the valve 58. The valve 180 defines a valve body 192 having four ports, port 178 connected to manifold conduit 170, port 182 connected to exhaust, ports 184 connected to conduit 50. The valve body 192 defines a central interior chamber 198 in which a plug type diaphragm 200 is received. The outer periphery 202 of diaphragm 200 cooperates with an annular valve seat 204 to control the flow of fluid from port 178 to ports 184. A spring 206 and spring retainer 208 are utilized to bias the outer periphery 202 into sealing contact with the valve seat 204. The central plug portion 210 cooperates with an annular valve seat 212 at port 182 to control the flow of fluid between ports 182 and 184. Diaphragm plug portion 210 is biased into sealing engagement with valve seat 212 by means of fluid pressure in conduit 170 acting on upper surface 218.

The operational characteristics of quick-release valves 180 are that a fluid flow (i.e. flow of higher pressurized fluid to a conduit or chamber at a lower pressurization) may be maintained from port 178 to ports 184. However, a fluid flow may not be maintained from ports 184 to port 178 as diaphragm 200 will lift to open port 184 to the exhaust port 182. Further, the valve 180, by establishing fluid communication from port 178 to ports 184 and from ports 184 to exhaust 182 will cause the pressurization at port 178 (conduit 170) and the pressurization at port 184 (conduit 50) to equalize at the pressurization of the lower pressurized conduit.

It is important to note that quick-release valves 180, through which the various valves at the wheel end assemblies are vented, is located remote from the wheel end assembly and may also be located remotely from the control valves, solenoid valves 154, 164 and 174. Quick-release valve 180 may be remotely controlled by a single pressure line 170 fluidly connecting port 178 of valve 180 with the solenoid valves via manifold conduit 170. As will be described in greater detail below, for quicker exhausting of the system and/or quicker operation of wheel end valves 56 and 58, a separate quick release valve may be provided at each axle or for each wheel end assembly.

By controlling the pressurization in conduit 170, the minimum pressure to which conduits 50 and 52 and all chambers fluidly connected thereto will automatically be vented through the quick-release valve 180 is also controlled. During the deflation mode of operation of system 10, the quick-release valve will exhaust conduits 50 and 52, which are then connected to the tire chamber 74 through control valve 58, to a pressure equalling the regulated pressure from regulator 156. During system shutdown (steady state operation), tire chamber 74 is isolated from the conduit 52 by control valve 58 and conduit 170 is exhausted to atmosphere through shut-off valve 174 allowing conduits 50 and 52 and the seal chamber 32 to be exhausted to atmosphere through the quick-release valve 180.

The pressure transducer 186 may be of any commercially available design and provides a signal, preferably an electric signal, indicative of the pressure in conduit 170.

The operation of the pneumatic components of central tire inflation system 10 is as follows. Under normal or steady state conditions, i.e. when tire inflation system 10 is not activated, the interior chamber 74 of tire 12, and thus manifold conduit 68, will be pressurized to some pressurization level greater than the minimum pressurization level, such as, for example, 75 psi for highway travel, 30 psi for cross country travel or 20 psi for operation in sand, mud or snow. If the pressurization of tire 12 is below the minimum pressure level (such as 10 psi) the tire must be pressurized to at least a minimum pressurization level by means of the manual inflate and pressurization check valve 60. In the steady state condition, the inflation valve 154 and the deflate valve 164 are closed and the shutoff valve 174 is open. Under these conditions, supply pressure is present in conduit 146 and regulated pressure is present in conduit 160. As the shutoff valve is open, conduit 170 is vented and thus the upper surface 218 of the diaphragm 200 of quick release valve 180 is exposed to atmospheric pressure only. Whatever pressure may be present in conduits 62, 52 and 50 will be vented to atmosphere as a result of such pressure acting on the lower surface 220 of diaphragm 200 causing the plug 210 to disengage the valve seat 212 connecting conduit 50 to exhaust through ports 184 and 182 of quick-release valve 180. As manifold portion 62 of conduit 52 is vented to atmosphere, there will be only atmospheric pressure present in ports 64 and 66 of valves 56 and 58, respectively and thus ports 70 and 72 of valves 56 and 58, respectively will be sealed to isolate the conduit 68 and the tire 12 at tire inflation pressure from the remainder of the system. As conduits 52 and 50 are vented, or quickly become vented through quick-release valve 180, the rotary seals 28 and 30 defining seal chamber 32 are exposed to atmospheric or substantially atmospheric pressure on both sides thereof.

Figure 7:
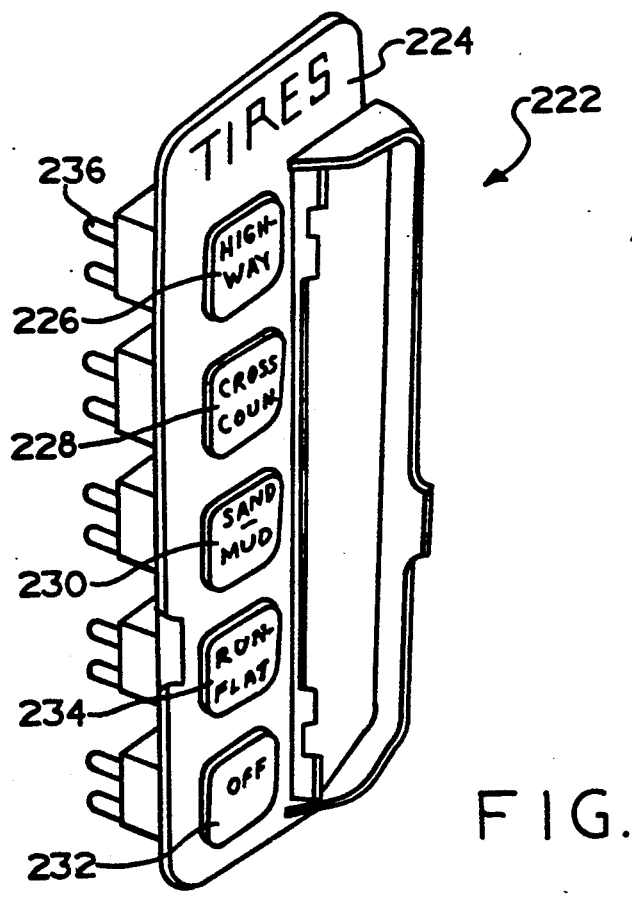
FIG. 7 is a perspective view of the operator control panel.

Preferably, the operator is provided with a control panel 222 in the vehicle operating cab which control panel may be see in greater detail by reference to FIG. 7. A typical control panel will include a panel body 224, preferably mountable in the vehicle dashboard, having a multiplicity (here shown as 5) of lightable push buttons 226, 228, 230, 232 and 234. In the embodiment shown, push button 226 is marked "highway", push button 228 is marked "cross country", push button 230 is marked "sand, mud", push button 232 is marked "off" and push button 234 is marked "run flat". Of course, additional control buttons may be provided and the operator may be provided with a gauge or LED or LCD readout indicating current tire pressure inflation and/or the operator may be provided with a control whereby a specific inflation pressure may be requested. Each of the control buttons includes connector means 236 for connection to a central control unit as will be described in greater detail below.

In one embodiment of control panel 222, a steady light at one of the buttons 226, 228 or 230 will indicate the pressure setting presently being maintained by the system 10. The operator may push another button and its light will blink until the new pressure is obtained at which time that button will glow steadily. If the operator pushes the off button 232, the control will select highway pressure and then deactivate the system and the off button will glow steadily. To provide maintenance of an operator or system selected pressure, the system will periodically, several times an hour, monitor the pressure maintained in the various tires and take whatever corrective action (inflate or deflate) that is required to maintain said selected pressure. Insufficient air supply and/or other malfunctions may be indicative by blinking of the off button. As will be described in greater detail below, it is preferred that the control will sense vehicle speed and when the vehicle reaches a predetermined speed, such as 40 miles per hour, automatically inflate the tires to highway pressure and light the highway button 226. As a safety measure, the system will not respond to operator selection of cross country or sand-mud conditions by depression of buttons 228 or 230 above 40 miles per hour sensed vehicle speed.

When the operator selects an inflation pressure different from the current operating pressure, or during automatic periodic monitoring of current operating inflation pressures, the control unit 237, which may be a microprocessor based controller must measure the current inflation pressures to determine if inflation and/or deflation is required to obtain or maintain the selected desired pressure.

Briefly, the microprocessor based controller 237 will close the inflate valve 154, the deflate valve 164 and the shut-off valve 174. The inflate valve 154 will then be quickly pulsed (i.e. quickly opened and then reclosed) which will cause supply air pressure to act upon the upper surface 218 of the diaphragm 200 of the quick release valve 180 thus pressurizing conduits 50, 52 and 62. Assuming the pressure in the tire and in conduit 68 is above the minimum pressure, the low tire pressure shut-off valve 56 will remain closed and the supply pressure at port 66 of the control valve 58 will act on the underside 110 of diaphragm 90 of valve 58 to open fluid communication between ports 66 and 72 of valve 58. Tire pressure in conduit 68 will retain the valve 58 in the open condition, and thus tire pressure or substantially tire pressure will be present in conduits 62, 52 and 50 and, by the action of quick release valve 180, in conduits 170 and 188 leading to pressure transducer 186. Accordingly, pressure transducer 186 will be exposed to the tire pressure and will provide a signal indicative thereof to the control unit. It is understood, that for an accurate measurement of tire inflation pressure the system must be at equilibrium (i.e. with little or no fluid flow) which is the case with control valves 154, 164 and 174 in the closed positions thereof.

The controller 237 will then compare the present tire inflation pressure indicated by the signal from pressure transducer 186 to the desired tire pressure to determine if inflation or deflation is required. Should the controller 237 determine that inflation is required, it will cause system 10 to assume its inflate mode of operation for a period of time. Should the controller 237 determine that deflation is required, it will cause the system to assume its deflate mode of operation. Should the controller 237 determine that no action is required, it will cause the system to assume its system shut-off mode of operation. Each of these modes of operation will be described in greater detail below.

If, based upon a comparison of current monitored tire inflation pressure and operator or controller selected desired pressure, the system control unit 237 determines that inflation of the monitored tires is required, the system 10 will assume the inflation mode of operation. In the inflate mode of operation, deflate valve 164 and shut-off valve 174 are closed and inflate valve 154 is opened for a period of time. At the end of the period of time the inflate valve 154 is closed and the inflation pressure of the tire, which is present in conduits 68, 62, 52, 50, 170 and 188 is sensed by pressure transducer 186 to determine what, if any, further action is required. Opening of inflate valve 154 with the shut-off valve 174 and deflate valve 164 closed will result in supply pressure in manifold conduit 170 which supply pressure will flow around the exterior periphery of the diaphragm of quick-release valve 180 and into the conduit 50, through the rotary seal chamber 32, into conduit 52 and manifold portion 62 thereof and into ports 64 and 66 of valves 56 and 58, respectively. Assuming the inflation pressure present in conduit 68 is above the minimum inflation pressure, low tire pressure shut-off valve 56 will remain closed and fluid pressure at port 66 of control valve 58 will act upon the undersurface 112 of diaphragm 90 to open port 66 to port 72 for inflation of the tire 12 via conduit 68.

It is noted that a single pressure or exhaust conduit path, conduit 52 is utilized to both open the control valve 58 and to inflate the tire 12, and that inflation occurs at full supply pressure for rapid inflation of tire 12. At the end of the period of time, the inflation valve 154 is closed. As the inflate valve is closed while retaining the shut-off valve and deflate valve in the closed condition, the control valve 58 will remain open and the quick-release valve 180 will allow tire inflation pressure to be monitored by the pressure transducer 186.

If, based upon a comparison of current monitored tire inflation pressure and operator or controller selected desired pressure, the system control unit 237 determines that deflation of the monitored tires is required, the system 10 will assume the deflation mode of operation. In the deflation mode of operation and assuming conduit 170 has been pressurized to effect opening of wheel control valves 58, inflate valve 154 and shut-off valve 174 are closed, and deflate valve 164 is opened for a period of time. During this period of time, air in conduit 170 flows to the unshown exhaust port of pressure regulator 156 via deflate valve 164 and conduit 160. Pressure regulator 156 may be of conventional design and will limit the deflation rate and minimum pressure in conduit 170 to about 8-10 psi. The reduced pressure in conduit 170 creates a pressure differential across diaphragms 200 of pressure release valves 180 which lifts the diaphragms and allows tire pressure to exhaust via port 182 until pressure balance is reached. At the end of the time period, the deflate valve is closed and tire pressure is again monitored.

Upon obtaining an inflation or deflation pressure corresponding to the selected tire pressure (usually plus or minus a given percentage) the tire inflation system 10 will assume the shut-off mode of operation. In the shut-off mode of operation, the solenoid inflate valve 154 and deflate valve 164 are closed and the solenoid normally open shut-off valve 174 is open. Accordingly, manifold conduit 170 is exhausted to atmosphere, the pressure in conduits 62, 52 and 50 will rapidly exhaust to atmosphere via exhaust port 182 of the quick-release valve 180 causing the control valve 58 to close and the system 10 will assume the normal steady state condition. As indicated above, to maintain a desired pressure, it is preferred that while in the steady state mode, the control unit 237 will automatically cycle through the system pressure measurement mode of operation several times an hour.

Assuming that the vehicle operator has actuated the "cross country" button 228 on the control panel 222 with the system 10 in the normal steady state condition, should the operator sense enemy fire or believes combat is imminent, he would actuate the "run flat" button 234 on the control panel.

In accordance with the invention, actuation of the "run flat" button 234 causes the electronic timer or clock of the control unit 237 to automatically cycle the system pressure measurement mode of operation from several times an hour to several times a minute. Thus, the inflation valve 154 is energized several times a minute for a system pressure measurement at which time the control valves 58 remain open and the deflate valve 164 and shut off valve 174 are closed. Pressure transducer 186 is exposed to the tire pressure and generates a signal indicative of tire pressure to the control unit 237 so that tire pressure is monitored several times a minute and maintained at the selected cross country pressure in a manner explained above.

Should one of the tires 12 be hit with enemy fire, or be otherwise damaged while the "run flat" button 234 is actuated, the damaged tire will be identified quickly by sensing that a leakage is occurring, within no more than several seconds. The system 10 will immediately assume the inflate mode of operation with inflation occurring at full supply pressure and capacity up to the total capacity of the undamaged tires, the spare 144, the fluid pressure source 138, which includes the reservoir 140, the compressor 139 and the compressed air system 142. The system 10 will continuously monitor inflation pressure within and supply pressure to the damaged tire so long as the leakage rate of the damaged tire does not exceed the capacity of the pressure source to enable the vehicle to evacuate the combat area or otherwise continue operation.

When the leakage rate of the damaged tire exceeds the capacity of the air pressure source and the pressure of the damaged tire falls to the minimum pressure of 7 psi, the control valve 58 mounted on the damaged tire/wheel will be automatically closed. The control valve will remain closed so that the damaged tire is isolated and loss of system pressure through the damaged tire is prevented.

I claim:

1. A central tire inflation system for sensing and maintaining selected air pressures in tire chambers of tire assemblies mounted for rotation at opposite ends of at least one axle assembly supporting a chassis of a vehicle controlled by an operator; the system comprising:

an air source for providing pressurized air at pressure at least equal to normally maximum tire chamber air pressure;

selector means including means selectively activatable by the operator for preselecting one of several desired tire chamber air pressures;

a control circuit including means automatically operative several times per hour to activate a pressure check mode to compare tire pressure signals from a sensing means with a preselected tire pressure, and automatically operative to activate inflation and steady-state modes respectively in response to the sensed tire pressure being less than or within predetermined limits of the preselected tire pressure;

an air circuit for connecting the air source to each tire chamber, the air circuit including rotary seal means connecting non-rotatably mounted parts of the air circuit with rotatably mounted parts of the air circuit for communicating air therebetween;

a control valve secured to each tire assembly, each control valve having a first port connected to one of the rotatably mounted parts of the air circuit, a second port connected to the tire chamber of the associated tire assembly, and valving means movable to a position blocking air communication between the ports in response to the air circuit being vented to atmosphere and movable to a position unblocking the air communication between the ports in response to pressurization of the air circuit;

valve means operative in response to the automatic activation of the steady-state mode by the control circuit means to vent the air circuit to atmosphere for moving the valving means of the control valves to the blocking positions, the valving means operative in response to activation of the check mode to momentarily connect the air source to the air circuit to pressurize the air circuit and move the valving means of the control valves to the unblocking positions for establishing air pressure in the air circuit at the sensing means representative of tire pressure, and the valve means operative in response to automatic activation of the inflation mode by the control circuit means to again connect the air source to the air circuit for increasing the tire pressure; characterized by:

switch means manually activated by an operator during vehicle operation in hazard zones for automatically increasing the frequency of activating the check modes by the control circuit means, for automatically more quickly detecting low tire pressure conditions, and for automatically more quickly activating the inflation modes to prevent flat tire conditions within the air capacity of the air supply.

2. The central tire inflation system of claim 1, wherein said control circuit means automatically increases the frequency of activating the check modes to several times per minute in response to the manual activation of the switch means.

3. A central tire inflation system for sensing and maintaining selected pressures in tire chambers of tire assemblies mounted for rotation at opposite ends of at least one axle assembly supporting a chassis of a vehicle controlled by an operator; the system comprising:

an air source for providing pressurized air at pressure at least equal to normally maximum tire chamber air pressure;

selector means including means selectively activated by the operator for preselecting one of several desired tire chamber air pressures;

a control circuit including means automatically operative several times per hour to activate a pressure check mode to compare tire pressure signals form a sensing means with a preselected tire pressure, and automatically operative to activate inflation, deflation and steady-state modes respectively in response to the sensed tire pressure being less than or greater than or within limits of the preselected tire pressure;

an air circuit for connecting the air source to each tire chamber, the air circuit including rotary seal means connecting non-rotatably mounted parts of the air circuit with rotatably mounted parts of the air circuit for communicating air therebetween;

a control valve secured to each tire assembly, each control valve having a first port connected to one of the rotatably mounted parts of the air circuit, a second port connected to the tire chamber of the associated tire assembly, and valving means movable to a position blocking the second ports in response to air pressure at the first port being s stantially atmospheric pressure and movable to a position unblocking the second ports in response to a non-atmospheric pressure at the first port;

valve means operative in response to the automatic activation of the steady-state mode by the control circuit means to vent the air circuit to atmosphere for moving the valving means of the control valves to the blocking positions and for unpressurized operation of the rotary seal means; the valving means operative in response to the automatic activation of the check, inflate and deflate modes to apply the non-atmospheric pressure to the first ports for moving the valving means to the unblocking positions; and the valve means operative in response to: activation of the check mode to momentarily apply the non-atmospheric pressure for establishing an air pressure in the air circuit at the sensing means representive of tire pressure, activation of the inflate mode to connect the air source to the first ports for increasing the tire pressure, and activation of the deflate mode to connect the second ports to vent means for decreasing the tire pressure; characterized by:

switch means manually activated by an operator during vehicle operation in hazard zones for automatically increasing the frequency of activating the check modes by the control conduit means from several times per hour to several times per minute for automatically more quickly detecting low tire pressure conditions, and for automatically more quickly activating the inflation modes to prevent flat tire conditions within the air capacity of the air supply.

* * * * *